United States Patent
Yeh et al.

(10) Patent No.: US 10,272,293 B2
(45) Date of Patent: Apr. 30, 2019

(54) BODY MOTION ANALYSIS SYSTEM, PORTABLE DEVICE AND BODY MOTION ANALYSIS METHOD

(71) Applicant: Industrial Technology Research Institute, Hsinchu (TW)

(72) Inventors: Chun-Fu Yeh, Xingang Township (TW); Szu-Han Tzao, Taipei (TW); Ming-Chieh Tsai, Xinpu Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 213 days.

(21) Appl. No.: 15/389,854

(22) Filed: Dec. 23, 2016

(65) Prior Publication Data

US 2018/0178060 A1 Jun. 28, 2018

(51) Int. Cl.
- *A63F 13/00* (2014.01)
- *A63B 24/00* (2006.01)
- *G06K 9/00* (2006.01)

(52) U.S. Cl.
CPC ...... *A63B 24/0062* (2013.01); *A63B 24/0003* (2013.01); *G06K 9/00342* (2013.01); *A63B 2024/0065* (2013.01); *A63B 2220/62* (2013.01)

(58) Field of Classification Search
CPC .................. A63B 21/4032; G09B 19/0038
See application file for complete search history.

(56) References Cited

U.S. PATENT DOCUMENTS

| | | |
|---|---|---|
| 5,111,410 A | 5/1992 | Nakayama et al. |
| 8,235,870 B2 | 8/2012 | Hamilton |
| 8,864,597 B2 | 10/2014 | Kim et al. |
| 2008/0242437 A1* | 10/2008 | Taylor ................ A63B 24/0021 473/269 |
| 2011/0260890 A1 | 10/2011 | Larsen et al. |
| 2012/0283080 A1 | 11/2012 | Mayr |

(Continued)

FOREIGN PATENT DOCUMENTS

| CN | 102368297 A | 3/2012 |
|---|---|---|
| CN | 102294120 B | 2/2014 |

(Continued)

OTHER PUBLICATIONS

Geib et al., "Using posturography to assess expertise among tai chi practitioners," Biomedical Sciences Instrumentation, vol. 49, 2013, 7 pages.
Mao et al., "The duration and plantar pressure distribution during one-leg stance in Tai Chi exercise," Clinical Biomechanics, vol. 21, 2006, pp. 640-645.

(Continued)

*Primary Examiner* — James S. McClellan
(74) *Attorney, Agent, or Firm* — Birch, Stewart, Kolasch & Birch, LLP

(57) ABSTRACT

A body motion analysis system is provided. The body motion analysis system includes a pressure sensing plate, a data transmission device, and a data processing device. Two of the user's body parts exert pressure on the pressure sensing plate and the pressure sensing plate senses the pressure to output pressure distribution data. The pressure sensing plate transmits pressure-distribution stream data to the data processing device according to the pressure distribution data. The data processing device processes the pressure-distribution stream data to obtain sports performance of the user.

32 Claims, 18 Drawing Sheets

(56) References Cited

U.S. PATENT DOCUMENTS

| | | | |
|---|---|---|---|
| 2013/0165820 A1 | 6/2013 | Lin et al. | |
| 2015/0364059 A1* | 12/2015 | Marks | G09B 19/0038 482/9 |
| 2018/0055415 A1* | 3/2018 | Nakao | A61B 5/6829 |

FOREIGN PATENT DOCUMENTS

| | | |
|---|---|---|
| CN | 205391609 U | 7/2016 |
| EP | 1127541 B1 | 2/2004 |
| TW | 310588 U | 7/1997 |
| TW | I240624 B | 10/2005 |
| TW | I457793 B | 10/2014 |
| TW | M490268 | 11/2014 |
| TW | I468198 B | 1/2015 |

OTHER PUBLICATIONS

Sundholm et al., "Smart-Mat: Recognizing and Counting Gym Exercises with Low-cost Resistive Pressure Sensing Matrix," UBICOMP '14, Seattle, WA, USA, Sep. 13-17, 2014, pp. 373-382.

Wayne et al., "Complexity-Based Measures Inform Effects of Tai Chi Training on Standing Postural Control: Cross-Sectional and Randomized Trial Studies," PLOS ONE, Dec. 10, 2014, pp. 1-28.

Zorzi et al., "A kinematic and metabolic analysis of the first Lu of Tai Chi in experts and beginners," Applied Physiology, Nutrition, and Metabolism, vol. 40, Sep. 2015 (published at www.nrcresearchpress.com/apnm on Jul. 8, 2015), pp. 1-4 (5 pages total).

Taiwanese Office Action and Search Report for Taiwanese Application No. 106100040, dated Sep. 4, 2017.

* cited by examiner

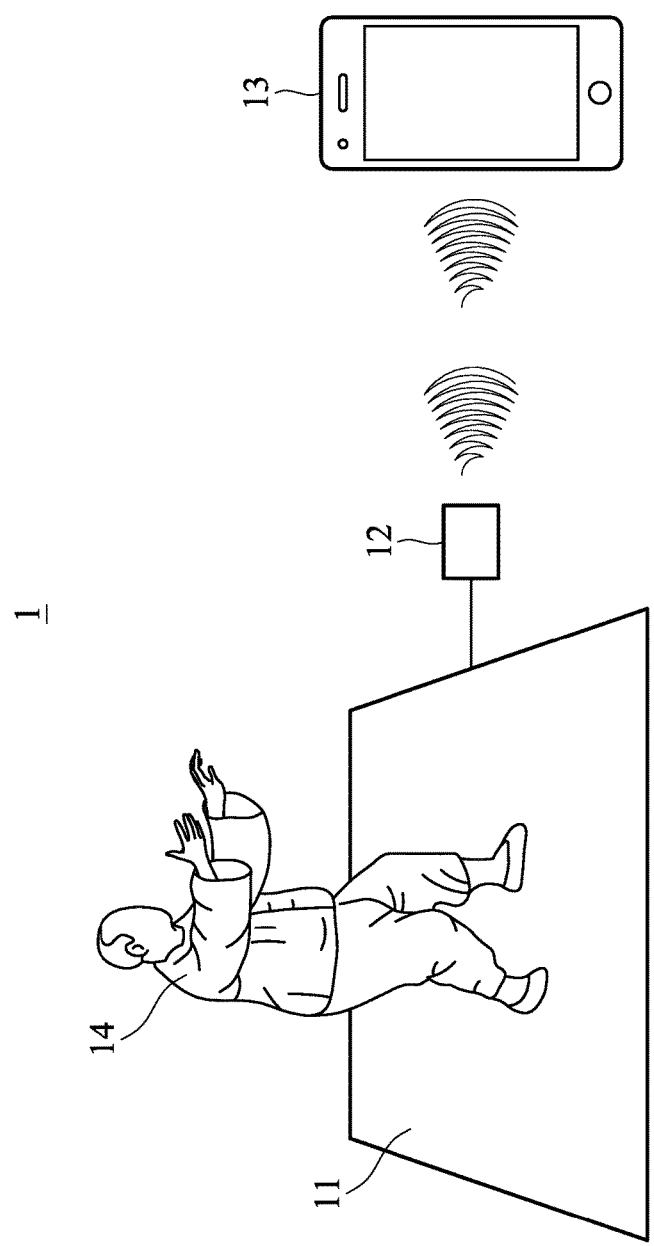

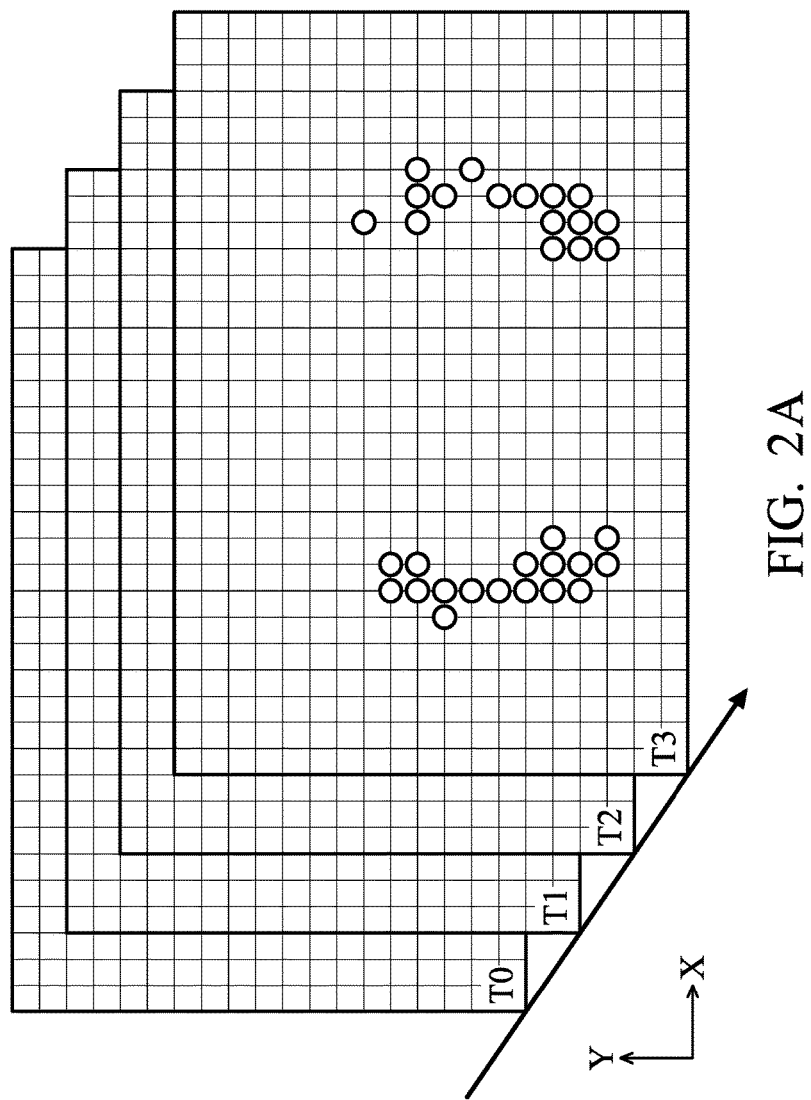

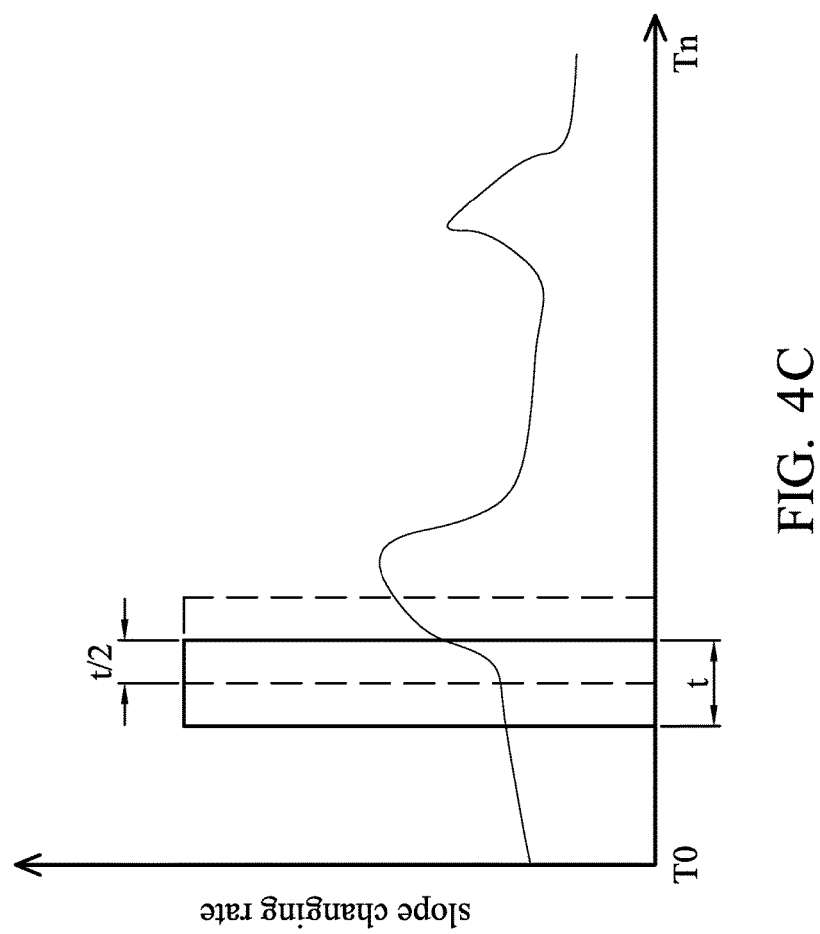

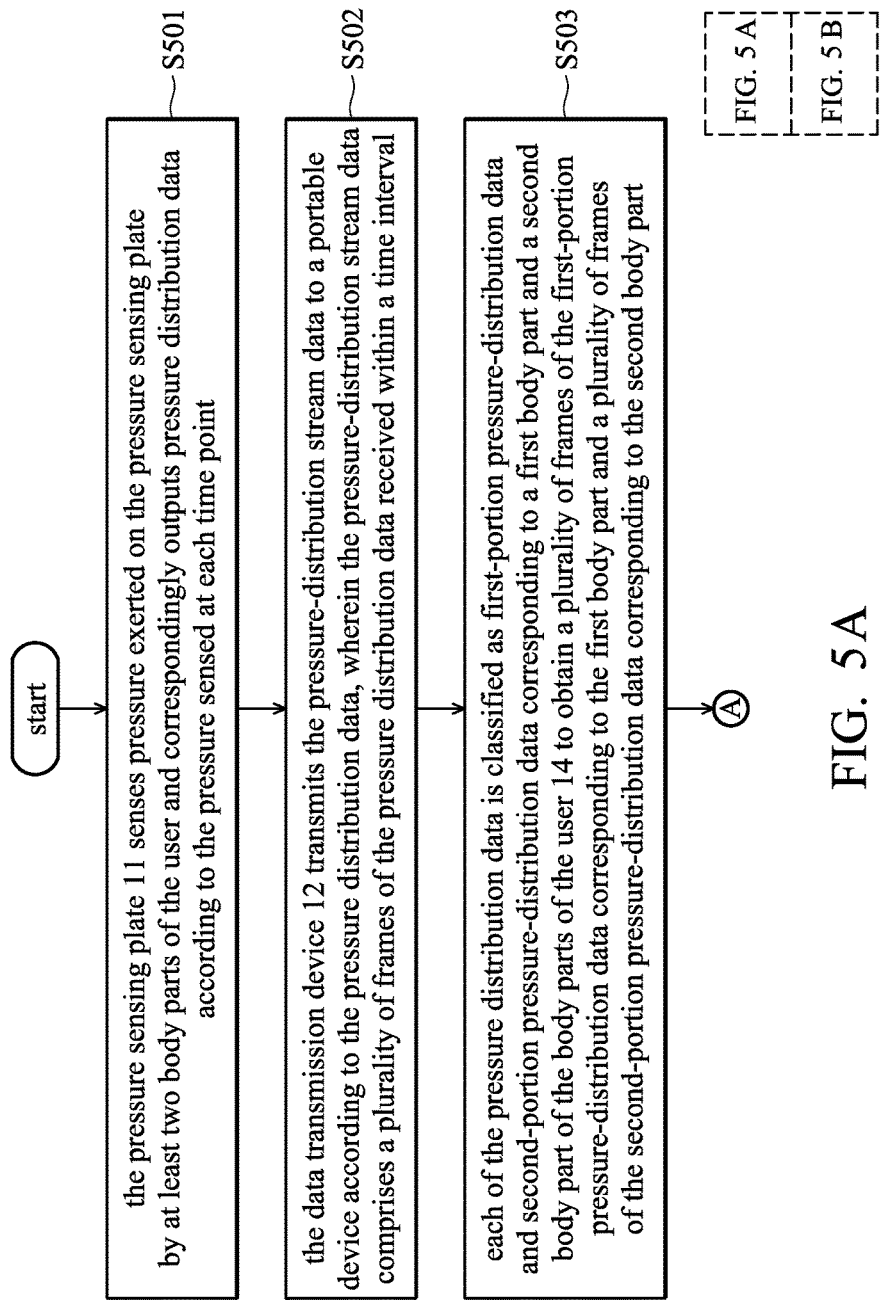

BODY MOTION ANALYSIS SYSTEM, PORTABLE DEVICE AND BODY MOTION ANALYSIS METHOD

TECHNICAL FIELD

The technical field relates to a body motion analysis system, a portable device, and a body motion analysis method.

BACKGROUND

In recent years, many medical clinical trials have proved that rehabilitation courses or sports that train core muscle groups and balance ability can help in relieving chronic pain (e.g. chronic lower back pain, shoulder and neck pain, muscle fiber pain, and osteoarthritis) and help to delay the course of Parkinson's disease, thereby reducing the risk of falling and improving quality of life. Except for courses prepared by medical professionals with clinical training, these kinds of rehabilitation courses or sports generally include yoga, Pilates, Tai Chi, and the like. Thus, the sports that train core muscle groups and balance ability will be referred to as standard courses in medical rehabilitation. In addition, the visibility and acceptance of the sports used in training core muscle groups and balance ability will also be promoted.

However, current sports assistive devices (e.g. somatosensory camera and G-Sensor inertial sensor) cannot accurately detect changes in the human body's center of gravity. Accordingly, the sports used for training core muscle groups and balance ability usually need professionals to be present to provide guidance.

SUMMARY

The present disclosure provides a body motion analysis system, a portable device, and a body motion analysis method.

An embodiment of the present disclosure provides a body motion analysis system. The body motion analysis system comprises a pressure sensing plate, a data transmission device, and a data processing device. The pressure sensing plate comprises a plurality of pressure sensors arranged in a matrix. The pressure sensing plate is used to sense pressure exerted on the pressure sensing plate by at least two of the user's body parts, and correspondingly output pressure distribution data according to the pressure sensed at each time point. The data transmission device is coupled to the pressure sensing plate. The data transmission device transmits pressure-distribution stream data according to the pressure distribution data, wherein the pressure-distribution stream data comprises a plurality of frames of the pressure distribution data received within a time interval. The data processing device is used to receive the pressure-distribution stream data and analyze the pressure-distribution stream data to obtain sports performance of the user.

Another embodiment of the present disclosure provides a portable device. The portable device is used to analyze sports performance of the user and comprises a receiving device and a data processing device. The receiving device is used to receive pressure-distribution stream data from a pressure sensing plate, wherein at least two body parts of the user exert pressure on the pressure sensing plate such that the pressure sensing plate senses and outputs the pressure-distribution stream data. The pressure-distribution stream data comprises a plurality of frames of the pressure distribution data received within a time interval. The data processing device is used to receive the plurality of frames of the pressure distribution data and to classify each of the pressure distribution data as first-localized pressure-distribution data and second-localized pressure-distribution data, corresponding to a first body part and a second body part of the user, to obtain a plurality of frames of the first-localized pressure-distribution data corresponding to the first body part and a plurality of frames of the second-localized pressure-distribution data corresponding to the second body part. The data processing device is used to analyze the first-localized pressure-distribution data and the second-localized pressure-distribution data to obtain the sports performance of the user.

Another embodiment of the present disclosure provides a body motion analysis method. The body motion analysis method comprises sensing, using a pressure sensing plate, pressure exerted on the pressure sensing plate by at least two body parts of the user and correspondingly outputting pressure distribution data according to the pressure sensed at each time point; transmitting, using a data transmission device, pressure-distribution stream data according to the pressure distribution data to a data processing device, wherein the pressure-distribution stream data comprises a plurality of frames of the pressure distribution data received within a time interval; and analyzing the pressure-distribution stream data, by the data processing device, to obtain sports performance of the user.

BRIEF DESCRIPTION OF THE DRAWINGS

FIG. 1A is a schematic diagram showing a body motion analysis system according to an embodiment of the present disclosure.

FIG. 2A is a schematic diagram showing raw timing data according to an embodiment of the present disclosure.

FIG. 4B and FIG. 4C are schematic diagrams showing a second method for determining the threshold value according to an embodiment of the present disclosure.

FIG. 5A and FIG. 5B show a body motion analysis method according to an embodiment of the present disclosure.

DETAILED DESCRIPTION

Figure 1C:
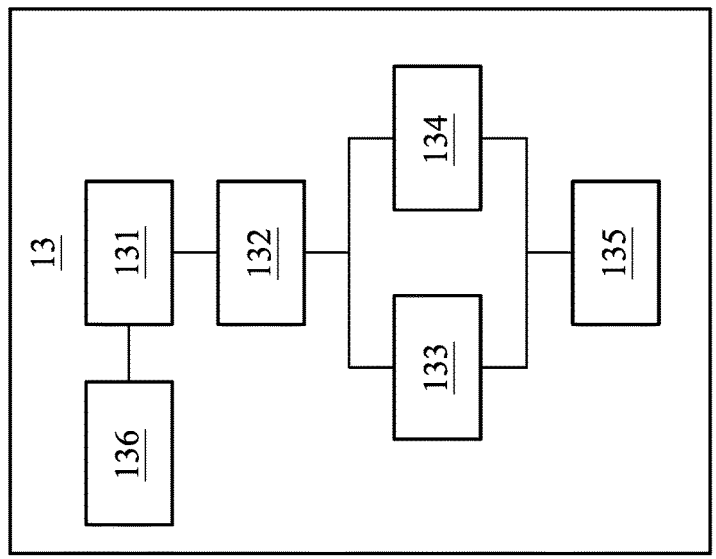
FIG. 1C is a block diagram showing a portable device according to an embodiment of the present disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

In contrast to other sports (e.g. running), sports used for training core muscle groups and balancing ability put more emphasis on the body's single-joint motion perception and action (i.e. medically known as proprioception) and motions of the trunk (body axis). There are two common torso motion of standing: One for the body translation, even if the trunk moving in one direction and with the body weight in the direction of the transfer; the other for the body rotation/spin, that is, the torso rotates clockwise or counterclockwise using the spine as the axis. Basically, the movement of the body can be decomposed into a combination of these two types of motion.

Although the present embodiments use Tai Chi for illustration, the present embodiments are not limited to Tai Chi. The present disclosure may also be applied to other exercises such as yoga, dance, aerobic exercise on a mat, and the like. For example, Tai Chi's movements (e.g. the moves of Tai Chi) contain multiple coherent movements and/or information about changes in the center of gravity, changes in the center of pressure, or changes in the center of the position corresponding to the multiple coherent movements. However, the sports performance described in the present disclosure is not limited to the moves of Tai Chi, and the present disclosure may also correspond to the multiple coherent movements and/or information about changes in the center of gravity, changes in the center of the pressure, or changes in the center of the position corresponding to the multiple coherent movements while the user engages in other sports such as yoga, dance, aerobic exercise on a mat, or the like. Tai Chi emphasizes the practitioners' own sense of movement, that is, the so-called medical proprioceptive, as well as the use of the axis of the body (from the head to the tail and the pelvis) and coordination between various limbs. Thus it shows the slow-motion characteristic, gentle motion characteristic, and standing appropriately of Tai Chi. The beginner will experience difficulty in practicing the moves of Tai Chi, including how to move the body, and how to keep the body upright during the movement or lack of movement of the central axis of the body during the movement and rotation. Therefore the teacher uses decompositions of the moves of Tai Chi so that the beginner can first become familiar with the decomposition of the move before practicing the complete Tai Chi move. For the above-mentioned Tai chi used in exercise therapy and pain relief, the motions of the Tai chi practitioner's body axis are mainly applied to the action treatment. For example, lowering the center of gravity of the body and putting most of the weight on one foot to develop the muscle strength of the lower limb and balance ability or using the spine rotation of the upper body to drive the rotation of the lower body for stretching and strengthening a core muscle group. However, whether it is the decomposition of the move for beginners or the concept of axial motion applied to exercise therapy, the teacher's oral guidance and physical guidance plays an important role. If the user is in extracurricular time and outside the classroom, the user most likely chooses to practice fist of the move appearance or not to practice directly, thus the learning effect and therapeutic effect are reduced. If there is a system which can continue to provide the decompositions of the moves after the Tai Chi class, then it would be helpful for beginners and in the application of Tai chi and movement therapy.

FIG. 1A is a schematic diagram showing a body motion analysis system 1 according to an embodiment of the present disclosure. The body motion analysis system 1 comprises a pressure sensing plate 11, a data transmission device 12 and a portable device 13. In FIG. 1A, a user 14 exercises on the pressure sensing plate 11, e.g. the user 14 practices Tai Chi on the pressure sensing plate 11. The pressure sensing plate 11 detects pressure exerted by the user 14 to obtain sensing data. The data transmission device 12 comprises a memory and a transmitter device. The memory of the data transmission device 12 stores the sensing data collected from the pressure sensing plate 11. The transmitter device of the data transmission device 12 transmits the sensing data collected within a time interval to the portable device 13. In another embodiment of the present disclosure, the data transmission device 12 directly transmits the sensing data collected from the pressure sensing plate 11 to the portable device 13. The portable device 13 receives the sensing data and analyzes the sensing data to obtain sports performance of the user 14. The portable device 13 can be a notebook, a tablet, a palmtop computer, a smartphone, a smart watch and/or another type of processor-controlled device that may receive, process, and/or transmit digital data.

Figure 1B:
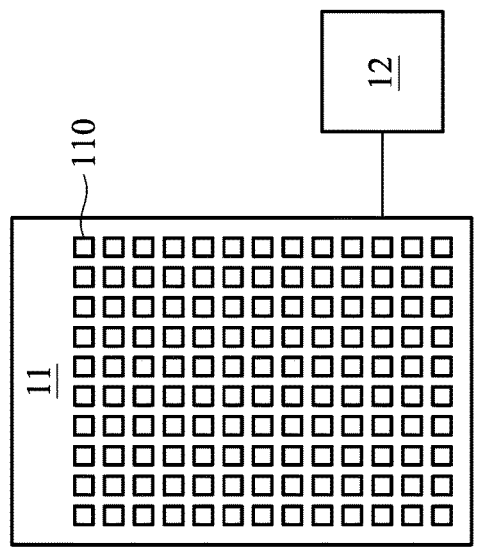
FIG. 1B is a block diagram showing the body motion analysis system according to an embodiment of the present disclosure.

FIG. 1B is a block diagram showing the pressure sensing plate 11 and the data transmission device 12 according to an embodiment of the present disclosure. FIG. 1C is a block diagram showing the portable device 13 according to an embodiment of the present disclosure. The pressure sensing plate 11 comprises a plurality of pressure sensors 110 distributed in a matrix. For example, pressure sensors 110 are arranged in a 20×30 matrix; but the present disclosure is not limited thereto, the pressure sensors 110 can be any number of pressure sensors arranged in any configuration, and the shape of the pressure sensor 110 is not limited to the description of the present embodiment. The pressure sensors 110 sense pressures exerted on the pressure sensing plate 11 by at least two body parts of the user and correspondingly output pressure distribution data according to the pressures sensed at each time point. In the present embodiment, the pressure distribution data can be a two-dimensional signal frame, wherein the two-dimensional signal frame comprises the position of each of the pressure sensors 110 and the corresponding sensed pressure.

In the present embodiment, the data transmission device 12 is coupled or connected to the pressure sensing plate 11. In another embodiment of the present disclosure, the data transmission device 12 is disposed in the pressure sensing plate 11 and connected to the plurality of pressure sensors 110. In an embodiment of the present disclosure, the data transmission device 12 comprises a microprocessor, a memory and a transmission unit. The memory of the data transmission device 12 stores the pressure distribution data output from the array-type pressure sensors 110. Then the transmission unit of the data transmission device 12 transmits pressure-distribution stream data to a data processing device for data processing and analysis through a wired or wireless transmission (e.g. Wi-Fi, Bluetooth or the like), wherein the data processing device can be, for example, one or more processors disposed in the portable device 13, but the present disclosure is not limited thereto. Accordingly, the data transmission device 12 transmits the pressure-distribution stream data according to the pressure distribution data. The pressure-distribution stream data comprises a plurality of frames of the pressure distribution data received within a time interval. For example, the time interval may be one minute and the pressure sensing plate 11 outputs one frame of the pressure distribution data per second, so each of the pressure-distribution stream data corresponds to 60 frames of pressure distribution data per minute. A receiver device 136 of the portable device 13 receives the pressure-distribution stream data through a wired or wireless transmission and the portable device 13 analyzes the pressure-distribution stream data to obtain sports performance of the user 14. In the present embodiment, the pressure-distribution stream data can be referred to as the stream information of the pressure intensity distribution.

In the present embodiment, the portable device 13 comprises a timing data processor 131, a motion recognizer 132, a motion playback device 133, a data visualization device 134, a display device 135, and a receiver device 136. The timing data processor 131 is connected to the motion recognizer 132 and the receiver device 136. The motion recognizer 132 is connected to the motion playback device 133, the data visualization device 134, and the display device 135. The motion playback device 133 and the data visualization device 134 are connected to the display device 135. The timing data processor 131, the motion recognizer 132, the motion playback device 133, and the data visualization device 134 can be one or more processors of the portable device 13, and the display device 135 can be a display screen, but the present disclosure is not limited thereto.

In another embodiment of the present disclosure, the display device 135 can be a display light disposed on the portable device 13 or a display light independently disposed outside the portable device 13 (e.g. an LED display disposed on the pressure sensing plate 11). Display colors of the display light can simply represent the sports performance of the user 14. For example, a red light may indicate that the sports performance of the user 14 is incorrect and a green light may indicate that the sports performance of the user 14 is correct. In this embodiment, the portable device 13 comprises a timing data processor 131 and a motion recognizer 132.

Figure 1D:
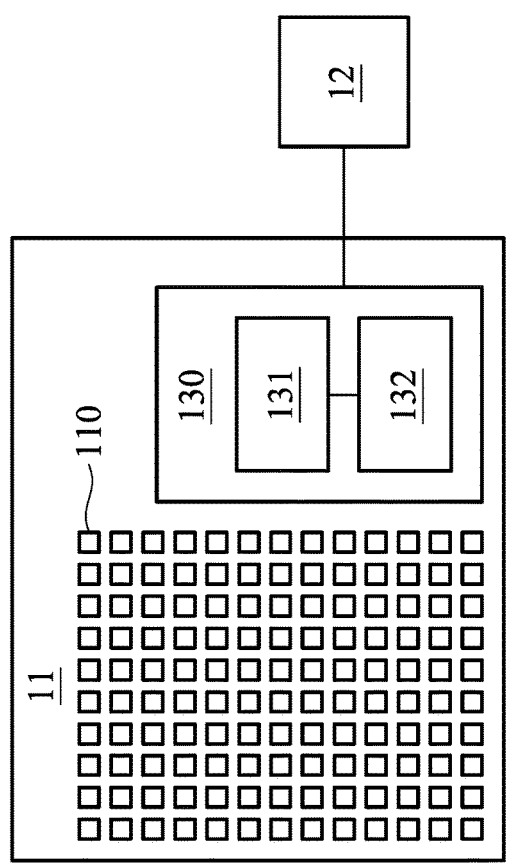
FIG. 1D is a block diagram showing the body motion analysis system according to another embodiment of the present disclosure.

FIG. 1D is a block diagram showing the body motion analysis system 1 according to another embodiment of the present disclosure. In FIG. 1D, the body motion analysis system 1 comprises the pressure sensing plate 11 and the data transmission device 12. In this embodiment, a data processing device 130 is disposed in the pressure sensing plate 11 and the data processing device 130 comprises a timing data processor 131 and a motion recognizer 132. The data processing device 130 is used to receive the pressure-distribution stream data from the plurality of pressure sensors 110 and analyze the pressure-distribution stream data to obtain sports performance of the user 14. In FIG. 1D, the timing data processor 131 and the motion recognizer 132 of the data processing device 130 is connected to the data transmission device 12. Thus a memory of the data transmission device 12 stores processed data (e.g. the sports performance of the user 14) from the data processing device 130 (the timing data processor 131 and the motion recognizer 132). Then a transmission unit of the data transmission device 12 transmits the processed data (e.g. the sports performance of the user 14) from the data processing device 130 to the portable device 13 through a wired or wireless transmission (e.g. Wi-Fi, Bluetooth or the like).

In another embodiment of FIG. 1D, the body motion analysis system 1 further comprises the display device 135 and the data processing device 130 further comprises the motion playback device 133 and a data visualization device 134 which are connected to the motion recognizer 132. The display device 135 can be disposed in any portable device or computer device. The data visualization device 134 is used to convert main-body motion-direction information, first body-part motion-direction information, and second body-part motion-direction information output by the data transmission device 12 into the sports performance of the user 14. The motion playback device 133 is used to provide feedback on the sports performance of the user 14 via the display device 135.

FIG. 2A is a schematic diagram showing raw timing data (e.g. a plurality of frames of the pressure distribution data) according to an embodiment of the present disclosure. As shown in FIG. 2A, at different times T0~T3, the pressure sensing plate 11 respectively senses one corresponding pressure distribution data. Each of the pressure distribution data comprises pressure values sensed by each of the pressure sensors 110 and positions of the pressure sensors 110. In an embodiment, at time T3, a pressure value sensed by the pressure sensor 110 located at the $i^{th}$ column and $j^{th}$ row can be represented as $(x_i, y_j, V_{ij})$, wherein $x_i$ represents x-direction position of the pressure sensor 110, $y_j$ represents y-direction position of the pressure sensor 110 and $V_{ij}$ represents the pressure value sensed by the pressure sensor 110 located at the ith column and jth row. Accordingly, at time T3, the pressure distribution data $P_{T3}$ can be represented as $P_{T3}=\{(x_1, y_1, V_{11}), \ldots, (x_i, y_j, V_{ij}), \ldots, (x_n, y_m, V_{nm})\}$, $i=1, \ldots, n$, $j=1, \ldots, m$, and the pressure-distribution stream data $S_{T0-TN}$ corresponding to the time points (T0~TN) can be represented as $S_{T0-TN}=(P_{T0}, \ldots, P_{Tk}, \ldots, P_{TN})$, $k=1, \ldots, N$.

Figure 2B:
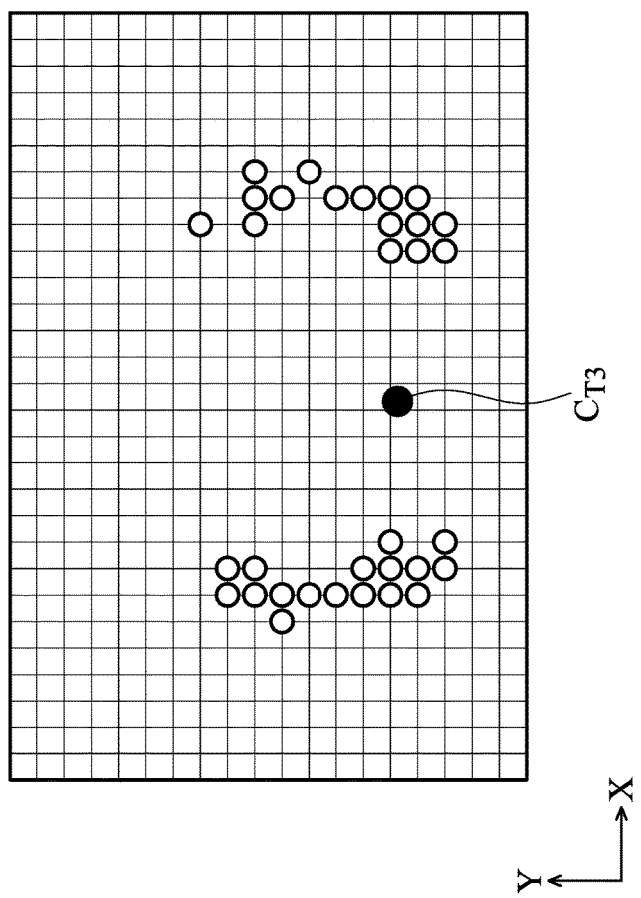
FIG. 2B is a schematic diagram showing an overall data center of raw timing data corresponding to a single point in time according to an embodiment of the present disclosure.

FIG. 2B is a schematic diagram showing an overall data center (e.g. a characteristic center) of raw timing data corresponding to a single point in time (e.g. T3) according to an embodiment of the present disclosure. After the timing data processor 131 of the portable device 13 receives the raw timing data (i.e. the pressure-distribution stream data), the timing data processor 131 immediately processes the raw timing data corresponding to a single point in time. Processing the raw timing data corresponding to a single point in time comprises calculating a characteristic center of each of the pressure distribution data. The characteristic center can be, but is not limited to, the center of gravity, center of pressure, or center of position. Accordingly, in the present embodiment, the timing data processor 131 analyzes the pressure-distribution stream data to obtain the characteristic center corresponding to each of the pressure distribution data. As shown in FIG. 2B, the timing data processor 131 processes the pressure distribution data $P_{T3}$ to obtain a corresponding characteristic center $C_{T3}$.

Figure 2C:
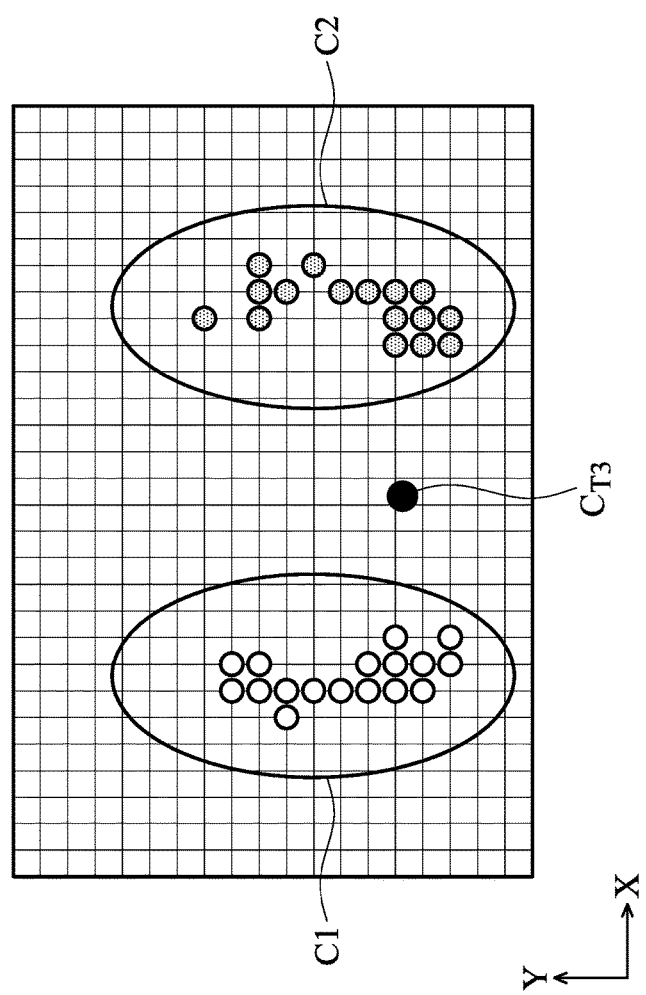
FIG. 2C is a schematic diagram showing classifying the raw timing data according to an embodiment of the present disclosure.

FIG. 2C is a schematic diagram showing classifying the raw timing data according to an embodiment of the present disclosure. Processing the raw timing data corresponding to a single point in time further comprises classifying the plurality of frames of the pressure distribution data according to a clustering algorithm (e.g. a K-means algorithm or the like). More specifically, in the present embodiment, the timing data processor 131 uses the clustering algorithm to classify the plurality of frames of the pressure distribution data as first-localized pressure-distribution data corresponding to a first body part of the user 14 and second-localized pressure-distribution data corresponding to a second body part of the user 14. For example, as shown in FIG. 2C, the timing data processor 131 classifies the plurality of frames of the pressure distribution data as two groups (C1 and C2) corresponding to the first body part and the second body part, wherein the first body part and the second body part can correspond to the feet of the user 14; but the present disclosure is not limited thereto. In one embodiment, the classified pressure distribution data $P_{T3}$ can be represented as $P_{T3}=\{(x_1, y_1, V_{11}, C1), (x_1, y_2, V_{12}, C1), \ldots, (x_i, y_j, V_{ij}, C2), \ldots, (x_n, y_m, V_{nm}, C2)\}$, i=1, \ldots, n, j=1, \ldots, m, wherein C1 represents sensing data corresponding to the first body part and C2 represents sensing data corresponding to the second body part.

Figure 2D:
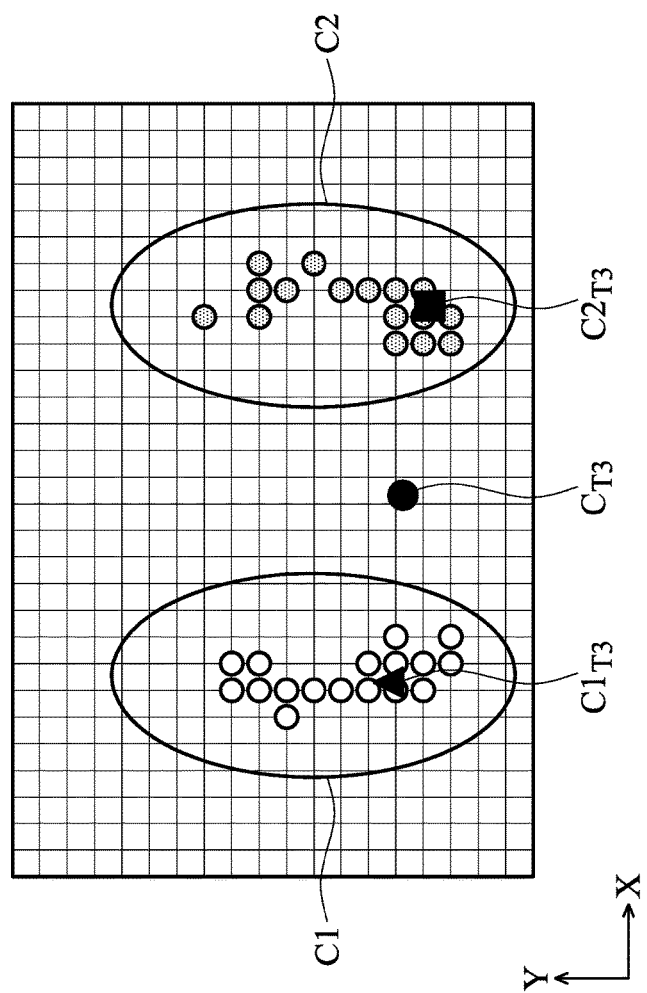
FIG. 2D is a schematic diagram showing cluster data centers corresponding to a single point in time according to an embodiment of the present disclosure.

FIG. 2D is a schematic diagram showing cluster data centers corresponding to a single point in time (e.g. a first-portion characteristic center and a second-portion characteristic center corresponding to time point T3) according to an embodiment of the present disclosure. As shown in FIG. 2D, the timing data processor 131 then calculates characteristic centers of each cluster. The method used in the calculation of the characteristic centers can be the same as the method used in the calculation of the characteristic center of the pressure distribution data. Therefore the timing data processor 131 analyzes each of the first-localized pressure-distribution data to obtain a corresponding first-portion characteristic center $C1_{T3}$ and analyzes each of the second-localized pressure-distribution data to obtain a corresponding second-portion characteristic center $C2_{T3}$. Meanwhile, the timing data processor 131 analyzes each of the first-localized pressure-distribution data to obtain a first portion total pressure corresponding to first-portion characteristic center $C1_{T3}$, and analyzes each of the second-localized pressure-distribution data to obtain a second portion total pressure corresponding to the second-portion characteristic center $C2_{T3}$. According to the first portion total pressure and the second portion total pressure, the timing data processor 131 can determine the weight distribution of the feet of the user 14 at time point T3.

Figure 3A:
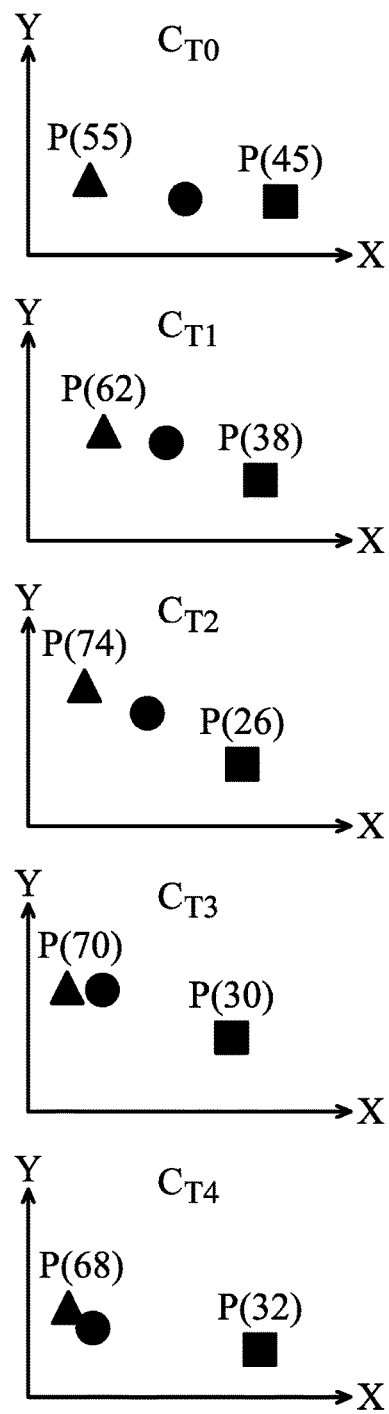
FIG. 3A is a schematic diagram showing the overall data center and the cluster data centers corresponding to a single point in time according to an embodiment of the present disclosure.

FIG. 3A is a schematic diagram showing the overall data center and the cluster data centers corresponding to a single point in time (e.g. the characteristic center, the first-portion characteristic center, and the second-portion characteristic center corresponding to time point T3) according to an embodiment of the present disclosure. As shown in FIG. 3A, the timing data processor 131 then processes the overall data center and the cluster data centers (i.e. the characteristic center, the first-portion characteristic center, and the second-portion characteristic center). In FIG. 3A, at time point T0, the characteristic center $C_{T0}$, first-portion characteristic center $C1_{T0}$ and second-portion characteristic center $C2_{T0}$ correspond to $C_{T0}$, P(55) and P(45), wherein ratio 55 and ratio 45 are respectively the first portion total pressure and the second portion total pressure. Similarly, analogizing to time points T2~T4.

Figure 3B:
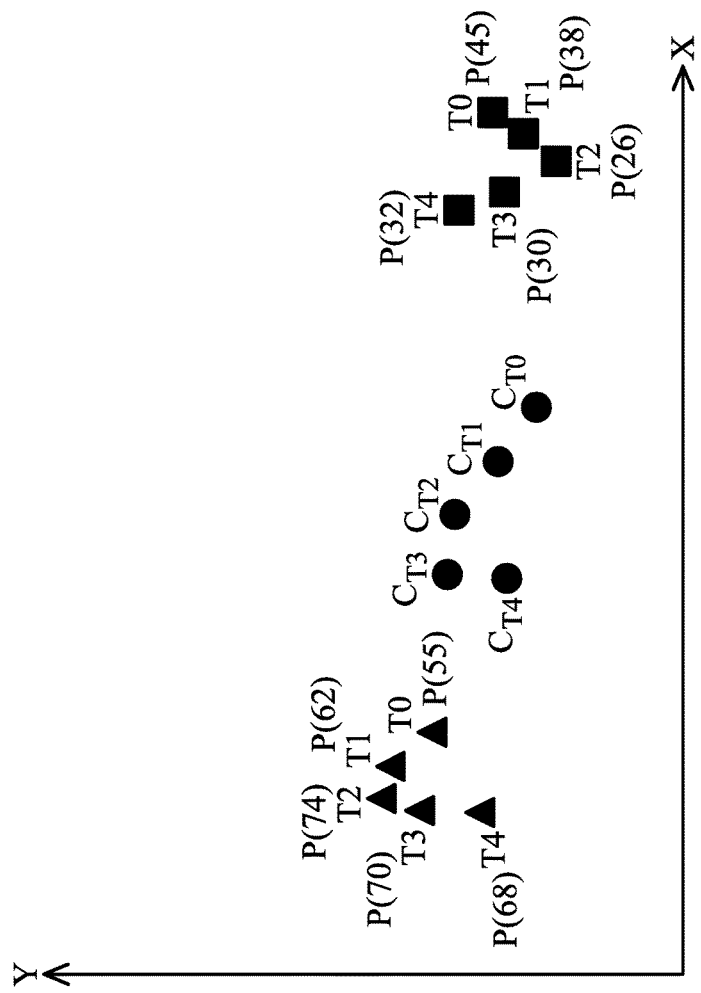
FIG. 3B is a schematic diagram showing a center moving trajectory, a first-portion center moving trajectory, and a second-portion center moving trajectory according to an embodiment of the present disclosure.

FIG. 3B is a schematic diagram showing a center moving trajectory, a first-portion center moving trajectory, and a second-portion center moving trajectory according to an embodiment of the present disclosure. As shown in FIG. 3B, the timing data processor 131 first respectively merges all of the data centers obtained at different time points (e.g. the characteristic centers, the first-portion characteristic centers, and the second-portion characteristic centers) as various sequential center moving trajectories. More specifically, the timing data processor 131 respectively merges the characteristic centers, the first-portion characteristic centers, and the second-portion characteristic centers during the time interval to obtain the center moving trajectory, the first-portion center moving trajectory, and the second-portion center moving trajectory.

Figure 3C:
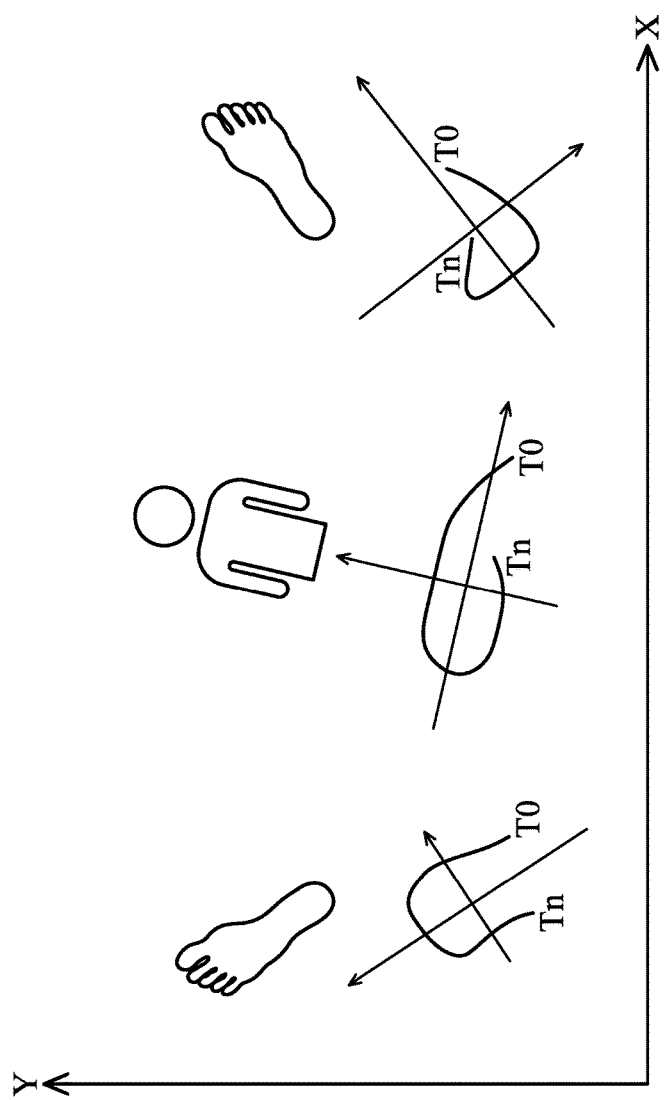
FIG. 3C is a schematic diagram showing the results of the principal component analysis performed on the center moving trajectory, the first-portion center moving trajectory, and the second-portion center moving trajectory according to an embodiment of the present disclosure.

FIG. 3C is a schematic diagram showing the results of the principal component analysis performed on the center moving trajectory, the first-portion center moving trajectory, and the second-portion center moving trajectory according to an embodiment of the present disclosure. Then the timing data processor 131 performs a principal component analysis (PCA) on each of the center moving trajectories (i.e. the center moving trajectory, the first-portion center moving trajectory, and the second-portion center moving trajectory) to obtain main direction of change corresponding to each of the center moving trajectories. The main direction of change is movement direction of the limb.

More specifically, in the present embodiment, the timing data processor 131 individually analyzes, according to the PCA algorithm, the center moving trajectory, the first-portion center moving trajectory, and the second-portion center moving trajectory to obtain main characteristic direction-changing data corresponding to the center moving trajectory, first-portion characteristic direction-changing data corresponding to the first-portion center moving trajectory and second-portion characteristic direction-changing data corresponding to the second-portion center moving trajectory. Then the timing data processor 131 obtains main-body motion-direction information, first body-part motion-direction information and second body-part motion-direction information according to the main characteristic direction-changing data, the first-portion characteristic direction-changing data and the second-portion characteristic direction-changing data.

In the present embodiment, the timing data processor 131 further uses Euler's rotation theorem to integrate the center moving trajectory, the first-portion center moving trajectory, and the second-portion center moving trajectory into a common coordinate system. Accordingly, as shown in FIG. 3C, the timing data processor 131 transforms the coordinate axes of the original pressure distribution data into the coordinate axes obtained by the PCA. Thus positive and negative changes of the data obtained in the above steps can correspond to actual limb movements (e.g. a positive change may correspond to a bending of the ankle joint).

In the present embodiment, the main-body motion-direction information comprises translation and spin of a central axis of the body of the user 14 on the pressure sensing plate 11, the first body-part motion-direction information comprises load-supporting, translation, and spin of the first body part (e.g. the left foot), and the second body-part motion-direction information comprises load-supporting, translation, and spin of the second body part (e.g. the right foot). Finally, the motion recognizer 132 recognizes the sports performance of the user 14 during the time interval according to the main-body motion-direction information, the first body-part motion-direction information, and the second body-part motion-direction information.

In the present embodiment, the motion recognizer 132 comprises a translation and spin recognition unit. The translation and spin recognition unit recognizes motion types for each of the motion stages. The translation and spin recognition unit divides a series of motion trajectories into several motion stages by a threshold value, wherein each of the motion types corresponding to the motion stage comprises the translation of the user 14, spin of the user 14, or translation-with-spin of the user 14. The threshold value can be a default value stored in a memory of the portable device 13 or set by the user 14.

Figure 4A:
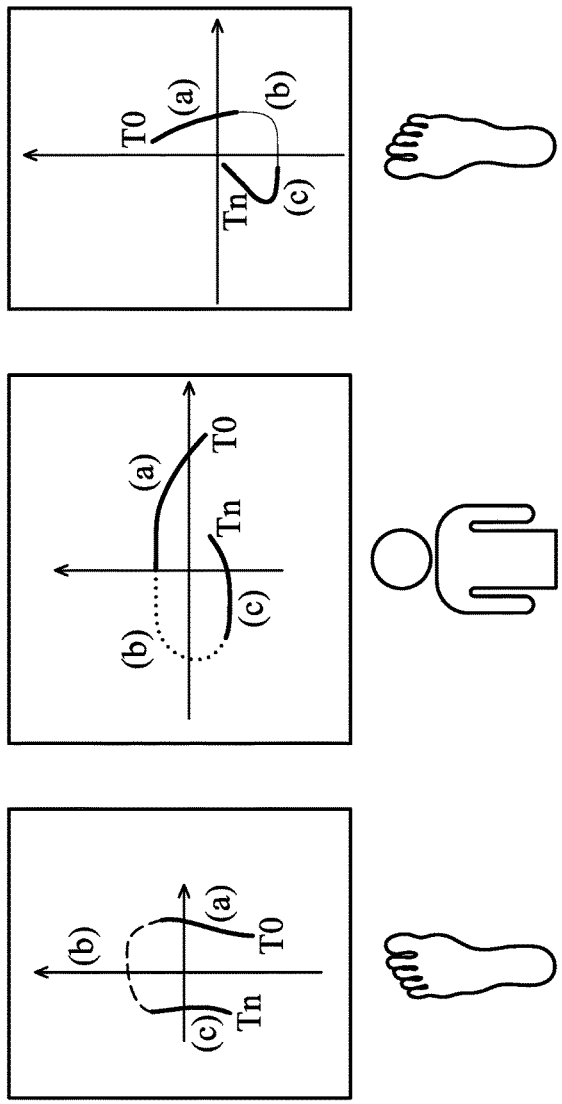
FIG. 4A is a schematic diagram showing weight transfer stages according to an embodiment of the present disclosure.

FIG. 4A is a schematic diagram showing weight transfer stages (e.g. the motion stages) according to an embodiment of the present disclosure. As shown in FIG. 4A, the motion recognizer 132 has divided the sports performance of the user 14 into three motion stages. In FIG. 4A, a motion comprising translation-with-spin of body can be divided into three motion stages, but the present disclosure is not limited thereto. The first motion stage (a) is in a limbs average-bearing period. The second motion stage (b) is in a single limb bearing period. The third motion stage (c) is back to the limbs average-bearing period.

In the present embodiment, there are several methods for determining the threshold value. The first method for determining the threshold value is to set a percentage of single limb bearing as the threshold value. For example, the threshold value is set as 70 percent of the user's weight. In the present embodiment, when the load ratio of the first-localized pressure-distribution data and the second-localized pressure-distribution data corresponding to a first time point is equal to the threshold, the motion recognizer 132 uses the first time point to divide the plurality of motion stages. For example, at the first time point, bear weight corresponding to the first body part is just 70 percent of the user's weight, and the motion recognizer 132 uses the first time point as a time distinguishing point for dividing two motion stages.

Figure 4B:
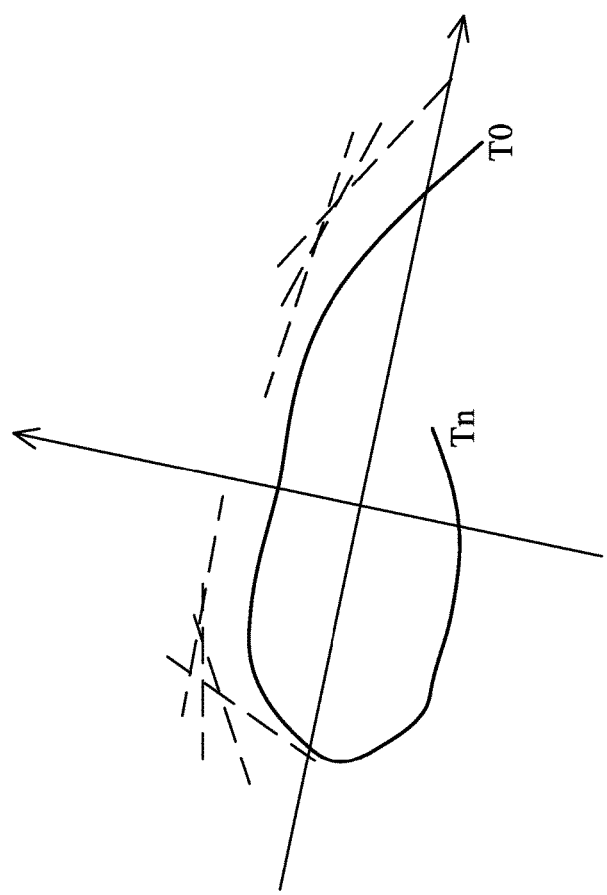

FIG. 4B and FIG. 4C are schematic diagrams showing a second method for determining the threshold value according to an embodiment of the present disclosure. In FIG. 4C, the second method for determining the threshold value is determined as changes in slopes of the center moving trajectory of total pressure. When a slope changing rate of the center moving trajectory corresponding to a first time point is equal to the threshold value, the motion recognizer 132 uses the first time point to distinguish the motion stages. The threshold value is used for distinguishing whether the motions of the user 14 belong to a moving period shown in (a) and (c) of FIG. 4A, or belong to a turning period shown in (b) of FIG. 4A. From FIG. 4A, the slope changing rate of the user 14 during the moving period is smaller than the slope changing rate of the user 14 during the turning period. In addition, the slope continuously changes during the turning period. Therefore the motion recognizer 132 calculates the slope changing rate of the center moving trajectory of the total pressure (i.e. the motion recognizer 132 calculates a displacement diagram shown in FIG. 4A to obtain an acceleration diagram shown in FIG. 4C) and sets a time window t. Starting with time point T0, the motion recognizer 132 calculates an average value for the slope changing rate among the time window t. After each half of the time window t, the motion recognizer 132 repeats the above calculation until time point Tn. If the difference between two adjacent time windows t just exceeds the threshold value or is just below the threshold value, the motion recognizer 132 sets the time point corresponding to the two adjacent time windows t (e.g. time point T5) as the turning point of the motion stages (e.g. the demarcation points between three motion stages (a), (b), (c) in FIG. 4A).

In the present embodiment, the motion recognizer 132 of the portable device 13 further comprises a sports performance analysis unit. The sports performance analysis unit of the motion recognizer 132 recognizes translation motion and spin motion for the trajectory of each motion stage comprising the center moving trajectory and the cluster center moving trajectories and thereby obtains motion types corresponding to each of the motion stages.

More specifically, the sports performance analysis unit executes an appropriate performance assessment of the motion stages. For example, when the motion type of the motion stage is spin, a spin performance assessment is executed; when the motion type of the motion stage is translation, a translation performance assessment is executed; when the motion type of the motion stage is translation-with-spin, a translation performance assessment and a spin performance assessment are both executed. The sports performance analysis unit comprises a first calculation unit, a second calculation unit, and a third calculation unit. The first calculation unit is used for calculating translation-amount and translation-direction of the body or body part. The calculation method of the translation-amount is a vector length of an origin and a destination of the trajectory, and the calculation method of the translation-direction is a direction pointed by the vector of the trajectory. The second calculation unit is used for calculating spin-amount and spin-direction of the body or body part. The spin-amount and the spin-direction are also calculated by vector length and vector direction produced by the trajectory. The third calculation unit is used for calculating ratios between the total pressure and each of the cluster total pressures.

In the present embodiment, the motion recognizer 132 of the portable device 13 is connected to the motion playback device 133, the data visualization device 134, and the display device 135. The data visualization device 134 is used to convert the main-body motion-direction information, the first body-part motion-direction information, and the second body-part motion-direction information into the sports performance of the user 14. The motion playback device 133 is used to provide feedback on the sports performance of the user 14 via the display device 135.

In the present embodiment, after the sports performance analysis unit of the motion recognizer 132 finishes the motion recognition and sports performance assessment, the present data of the motion trajectories and assessment result will be sent to the motion playback device 133 and the data visualization device 134. The motion playback device 133 can help the user 14 to review the present data of the motion trajectories, and the data visualization device 134 visualizes the translation-amount, the translation-direction, the spin-amount, and the spin-direction and displays the visualization result on the display device 135 of the portable device 13. Meanwhile, the data visualization device 134 also provides advice on motion corrections on the display device 135 for the user 144.

In another embodiment of the present disclosure, a user A suffers from chronic lower back pain and goes to the rehabilitation center of a hospital to train core muscles two or three days a week. The professional staff member of the rehabilitation center tells the user A that the training goal of this week is a core muscle relaxation exercise and gives the user A an action film for today's rehabilitation program. The content of the action film is average weight-bearing on both feet with a knee squat first and slowly placing the weight on the left foot while keeping the upper body straight. Then, when most of the weight is placed on the left foot, the action film teaches turning the upper body to the left and back to the status of average weight-bearing on both feet. Then the action film teaches back to the status of average weight-bearing on both feet and turning the upper body back toward the front. The user A opens his tablet and clicks the action film for today's rehabilitation program. After the user A finishes the training regimen provided by the rehabilitation program, the body motion analysis system 1 installed on the tablet processes the motion information sensed and collected from the pressure sensing plate 11 and performs motion recognition and sports performance assessment. Then the body motion analysis system 1 displays the assessment results on the display screen of the tablet (i.e. the display device 135 of the portable device 13).

In another embodiment of the present disclosure, a user B uses the body motion analysis system 1 for practicing Tai Chi. Tai Chi emphasizes motions of body translation and body spin and coordination of translation and spin. At first, a Tai Chi teacher teaches the user B motions of body translation and body spin while practicing Tai Chi. The Tai Chi teacher teaches the user to turn the upper body to the left/right to rotate the entire body when the body shifts to the left/right. Then the Tai Chi teacher teaches the user to follow the above teaching principles back and forth. When the user B practices Tai Chi at home, the user B takes the portable device 13 (tablet) and selects the above course taught by the Tai Chi teacher, and then the user B can practice the above Tai Chi movement on the pressure sensing plate 11. After the user B finishes practicing, the display device 135 of the portable device 13 shows the overall sports performance of the user B and provides instructions for improvement. For example, the display device 135 of the portable device 13 indicates that the rotation to the right side is less complete than the rotation to the left side and that the user needs to turn further to the right side. When the portable device 13 detects that the user B has finished the Tai Chi course, the portable device 13 also informs the Tai Chi teacher that the user B has finished it. Then the Tai Chi teacher may set other advanced courses (e.g. shifting the body to the left with a spin and to the right with a spin and pause the body when arriving at the left/right side). When the user B starts the advanced courses, the body motion analysis system 1 tracks whether the motions of the user B are correct or not (e.g. whether the motions of the user B meets the shifts between left and right with a spin) and understands the practicing status of the user B (e.g. whether the user has correctly practiced the motions of translation-with-spin or not).

Figure 5B:
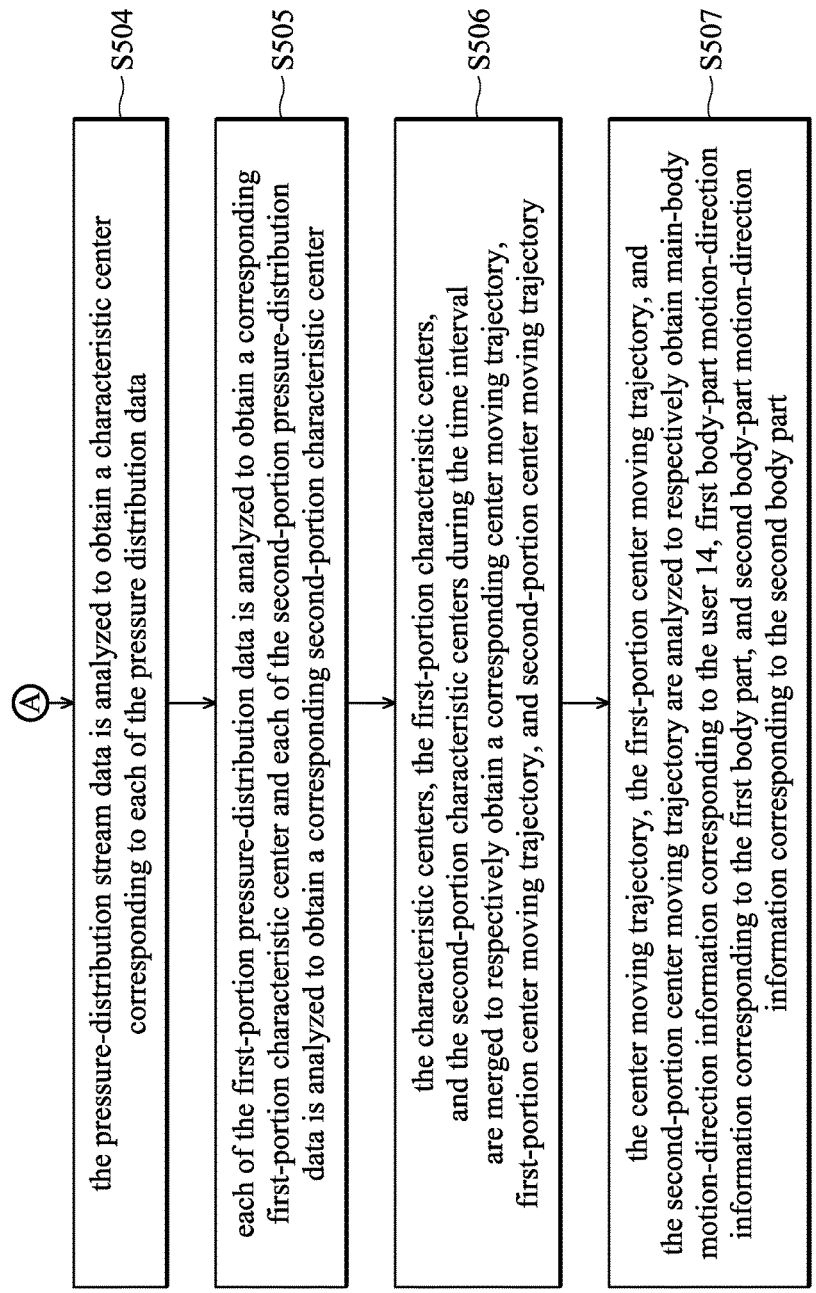

FIG. 5A and FIG. 5B show a body motion analysis method according to an embodiment of the present disclosure. In step S501, the pressure sensing plate 11 senses pressure exerted on the pressure sensing plate by at least two body parts of the user and correspondingly outputs pressure distribution data according to the pressure sensed at each time point. In step S502, the data transmission device 12 transmits the pressure-distribution stream data to a portable device 13 according to the pressure distribution data, wherein the pressure-distribution stream data comprises a plurality of frames of the pressure distribution data received within a time interval.

In step S503, each of the pressure distribution data is classified as first-localized pressure-distribution data and second-localized pressure-distribution data corresponding to a first body part and a second body part of the body parts of the user 14 to obtain a plurality of frames of the first-localized pressure-distribution data corresponding to the first body part and a plurality of frames of the second-localized pressure-distribution data corresponding to the second body part. In step S504, the pressure-distribution stream data is analyzed to obtain a characteristic center corresponding to each of the pressure distribution data. In step S505, each of the first-localized pressure-distribution data is analyzed to obtain a corresponding first-portion characteristic center and each of the second-localized pressure-distribution data is analyzed to obtain a corresponding second-portion characteristic center.

In step S506, the characteristic centers, the first-portion characteristic centers, and the second-portion characteristic centers during the time interval are merged to respectively obtain a corresponding center moving trajectory, first-portion center moving trajectory, and second-portion center moving trajectory. In step S507, the center moving trajectory, the first-portion center moving trajectory, and the second-portion center moving trajectory are analyzed to respectively obtain main-body motion-direction information corresponding to the user 14, first body-part motion-direction information corresponding to the first body part, and second body-part motion-direction information corresponding to the second body part. Finally, the main-body motion-direction information, the first body-part motion-direction information, and the second body-part motion-direction information are the sports performance of the user 14.

Figure 6A:
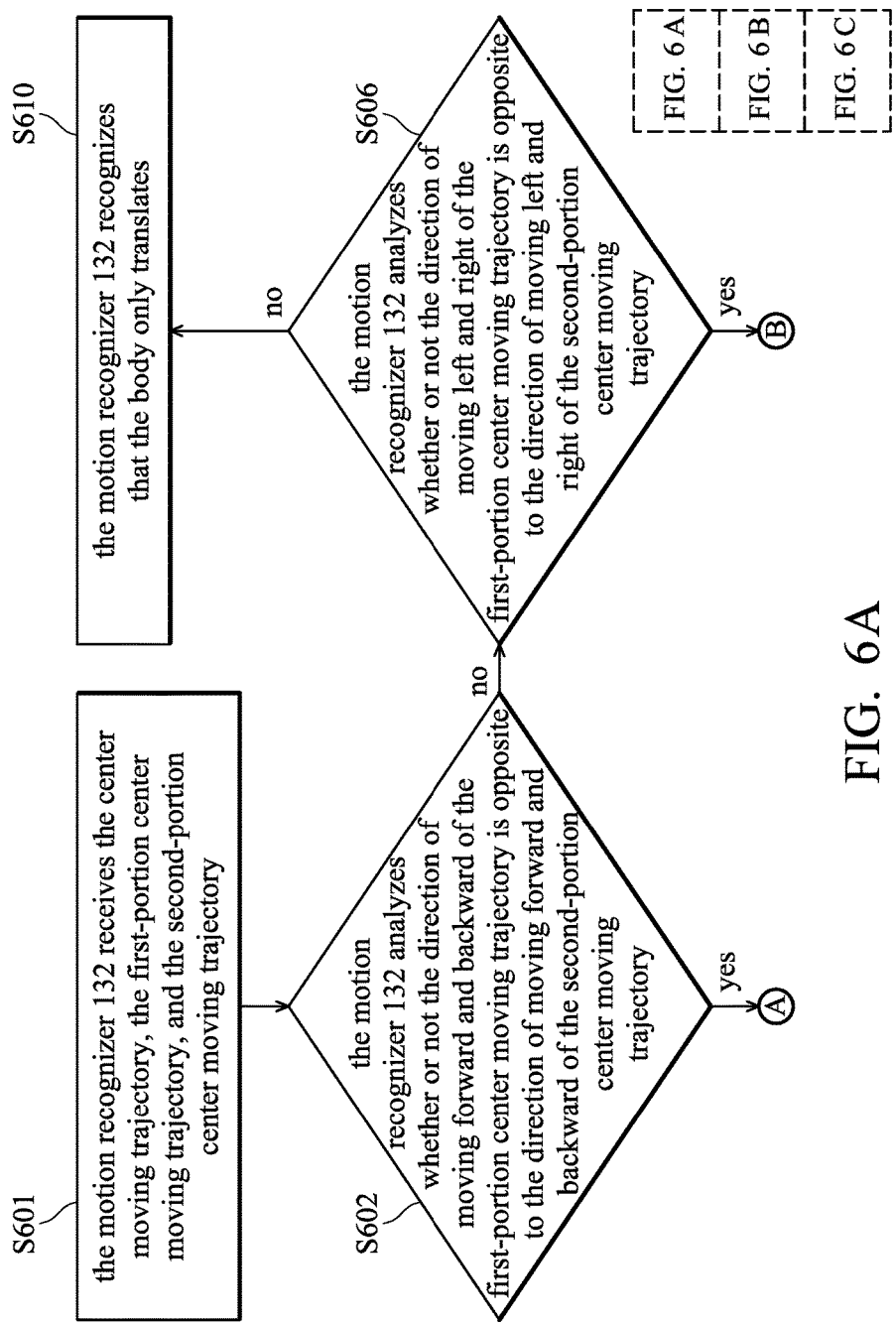
FIG. 6A, FIG. 6B and FIG. 6C show a method of recognizing body translation and body spin according to an embodiment of the present disclosure.
Figure 6B:
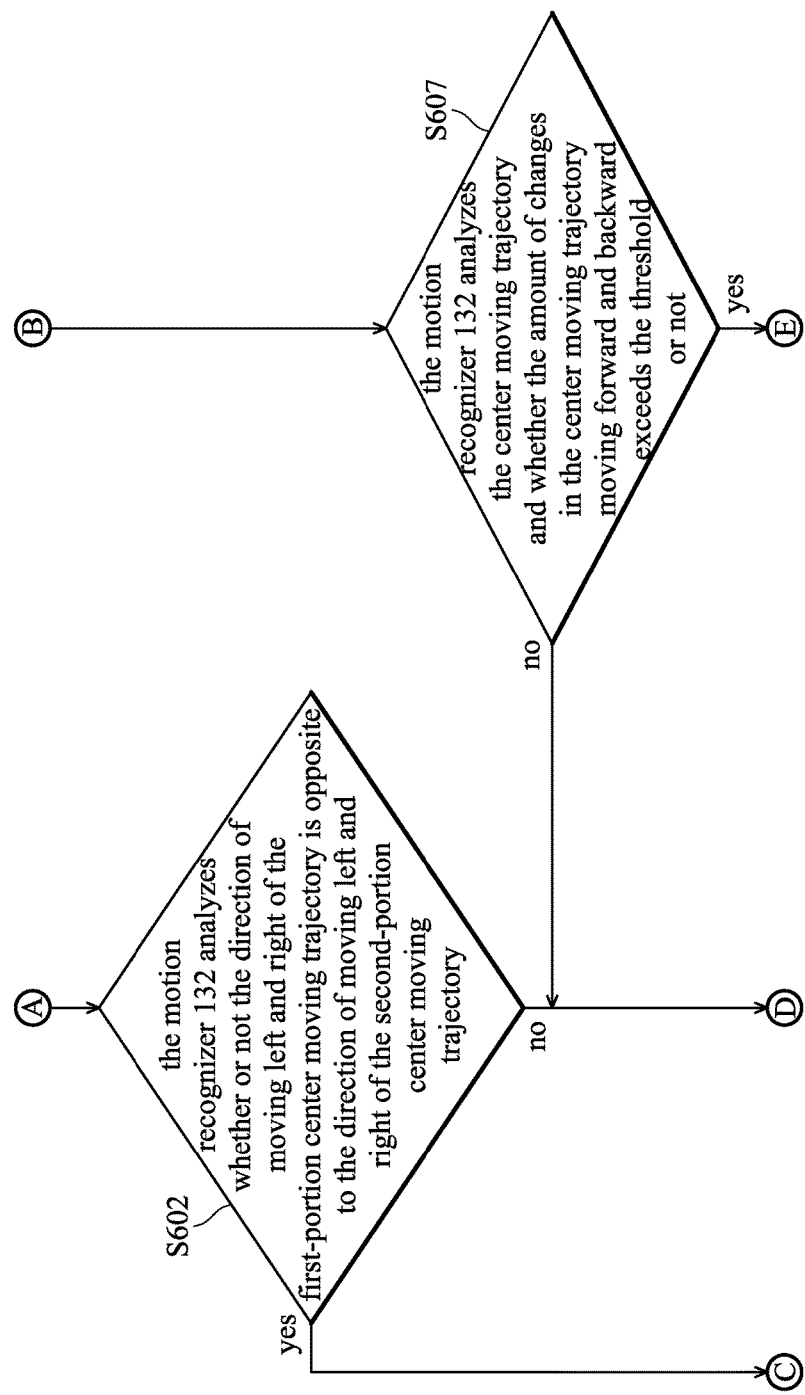
Figure 6C:
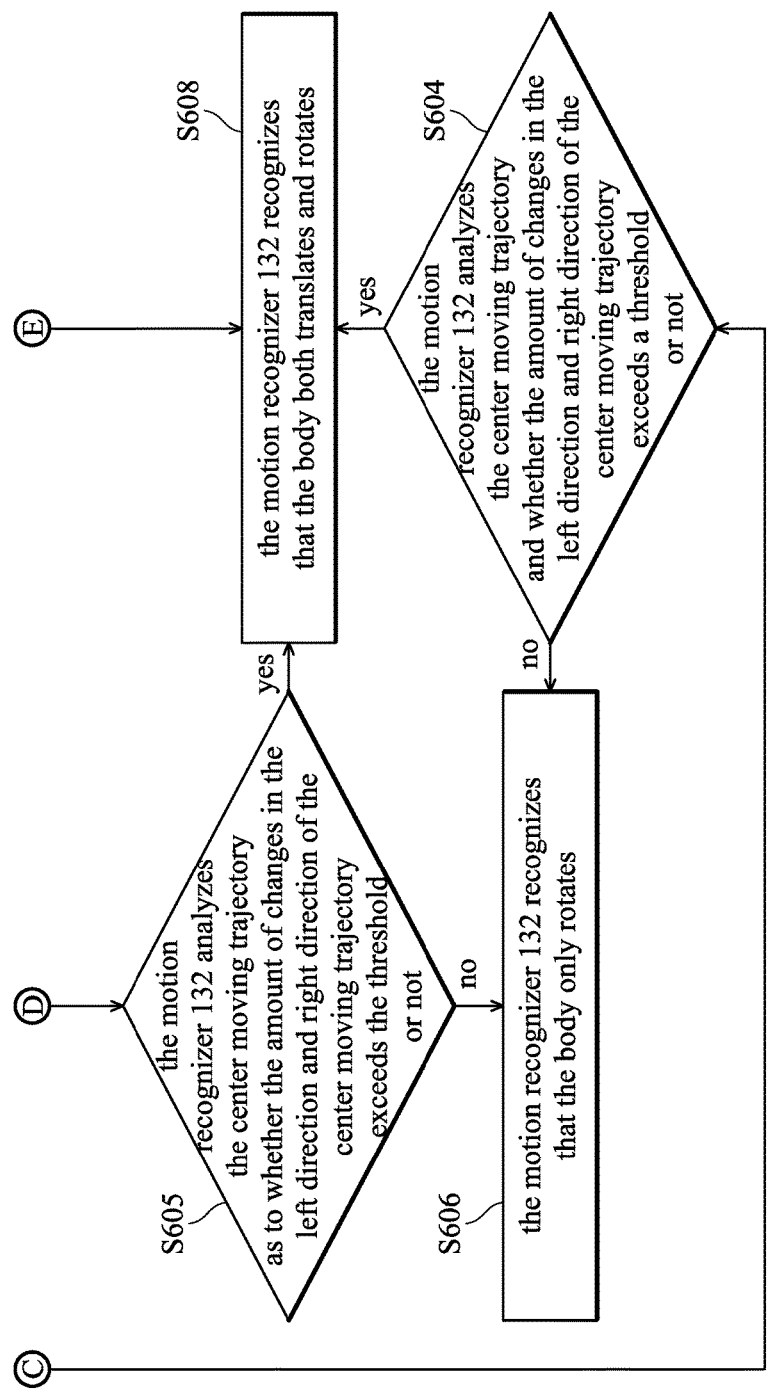

FIG. 6A, FIG. 6B and FIG. 6C illustrating a method of recognizing body translation and body spin according to an embodiment of the present disclosure. In the present embodiment of recognizing body translation and body spin, the motion recognizer 132 uses a dynamic threshold to determine the amount of changes in the left direction and right direction of the center moving trajectory and the amount of changes in the center moving trajectory moving forward and backward, wherein the dynamic threshold is different from the two kinds of threshold values described previously. In the present embodiment of recognizing body translation and body spin, the motion recognizer 132 presets an initial threshold value, e.g. 1.5 cm. At this time, when the amount of changes exceeds 1.5 cm, it can be seen as exceeding the initial threshold value. Then the user continues using the body motion analysis system 1. Then the body motion analysis system 1 (e.g. the portable device 13 or the data processing device 130) records the maximum moving amount/range in the left direction and right direction of the center moving trajectory and the maximum moving amount/range in the center moving trajectory moving forward and backward. When a first percentage (e.g. 15%) of the maximum moving amount/range exceeds the initial threshold value, the body motion analysis system 1 (e.g. the portable device 13 or the data processing device 130) sets the initial threshold value as a second percentage (e.g. 5%) of the maximum moving amount/range. Through the above dynamic threshold, the body motion analysis system 1 can adjust an appropriate threshold for distinct users and thereby enhance the accuracy of recognizing body translation and body spin.

In step S601, the motion recognizer 132 receives the center moving trajectory, the first-portion center moving trajectory, and the second-portion center moving trajectory. In step S602, the motion recognizer 132 analyzes whether or not the direction of moving forward and backward of the first-portion center moving trajectory is opposite to the direction of moving forward and backward of the second-portion center moving trajectory. If yes, the method proceeds to step S603; otherwise the method proceeds to step S606.

In step S603, the motion recognizer 132 analyzes whether or not the direction of moving left and right of the first-portion center moving trajectory is opposite to the direction of moving left and right of the second-portion center moving trajectory. If yes, the method proceeds to step S604; otherwise the method proceeds to step S605. In step S604, the motion recognizer 132 analyzes the center moving trajectory and whether the amount of changes in the left direction and right direction of the center moving trajectory exceeds a threshold or not. If yes, the method proceeds to step S608; otherwise the method proceeds to step S609. In step S605, the motion recognizer 132 analyzes the center moving trajectory as to whether the amount of changes in the left direction and right direction of the center moving trajectory exceeds the threshold or not. If yes, the method proceeds to step S608; otherwise the method proceeds to step S609.

In step S606, the motion recognizer 132 analyzes whether or not the direction of moving left and right of the first-portion center moving trajectory is opposite to the direction of moving left and right of the second-portion center moving trajectory. If yes, the method proceeds to step S607; otherwise the method proceeds to step S610. In step S607, the motion recognizer 132 analyzes the center moving trajectory and whether the amount of changes in the center moving trajectory moving forward and backward exceeds the threshold or not. If yes, the method proceeds to step S608; otherwise the method returns to step S605.

In step S608, the motion recognizer 132 recognizes that the body both translates and rotates. In step S609, the motion recognizer 132 recognizes that the body only rotates. In step S610, the motion recognizer 132 recognizes that the body only translates.

The above embodiments of the present disclosure provide systems and methods of assessment of motion types and sports performance of a body. The systems recognize the motion types of the user training core muscle groups and balance and calculate sports performance of each of the motion types by analyzing the data obtained from an array-type pressure sensing plate. Accordingly, it helps professionals with such exercise training and allows users to autonomously and properly practice such sports.

The above embodiments of the present disclosure provide a method of recognizing body translation and body spin. This method uses motion strategy of foot movement while the body is translating and spinning as a knowledge base and uses the knowledge base to recognize the motion type. Thus the method can obtain the motion types used by the user, and thereby confirm whether the motion strategy used by the user meets a goal set by the system or by professionals.

In particular, the body motion analysis method provided by the above embodiments of the present disclosure captures pressure distribution information using the array-type pressure sensing plate, wherein the pressure distribution information comprises a pressure value and a position of each sensing point. The body motion analysis method, through the motion recognizer and the sports performance analysis unit, estimates motion types and sports performance while the user is in a medical rehabilitation course or doing exercise. For example, estimating the motion type is belong to translation-with-spin, only translation or only spin, or calculating an amount of translation or rotation amplitude. Finally, the body motion analysis method visualizes the results of the exercise by visualizing the data and gives visual action-oriented training so that the user can obtain appropriate motion feedback.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the present disclosure has been described by way of example and in terms of preferred embodiment, it is to be understood that the present disclosure is not limited thereto.

On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A body motion analysis system, comprising:
a pressure sensing plate comprising a plurality of pressure sensors arranged in a matrix, used to sense pressure exerted on the pressure sensing plate by at least two body parts of a user and correspondingly output pressure distribution data according to the pressure sensed at each time point;
a data transmission device, coupled to the pressure sensing plate, transmitting pressure-distribution stream data according to the pressure distribution data, wherein the pressure-distribution stream data comprises a plurality of frames of the pressure distribution data received within a time interval; and
a data processing device, used to receive the pressure-distribution stream data and analyze the pressure-distribution stream data to obtain sports performance of the user;
wherein the data processing device comprises:
a timing data processor, used to receive the pressure-distribution stream data, and classifying each of the pressure distribution data as first-localized pressure-distribution data and second-localized pressure-distribution data corresponding to a first body part and a second body part of the at least two body parts of the user to obtain a plurality of frames of the first-localized pressure-distribution data corresponding to the first body part and a plurality of frames of the second-localized pressure-distribution data corresponding to the second body part, wherein the timing data processor analyzes the pressure-distribution stream data, the plurality of frames of the first-localized pressure-distribution data and the plurality of frames of the second-localized pressure-distribution data to obtain the sports performance of the user;
wherein the data processing device is used to:
analyze the plurality of frames of the pressure distribution data of the pressure-distribution stream data to obtain a characteristic center corresponding to each of the pressure distribution data;
analyze each of the first-localized pressure-distribution data to obtain a corresponding first-portion characteristic center and analyze each of the second-localized pressure-distribution data to obtain a corresponding second-portion characteristic center; and
respectively merge the characteristic centers, the first-portion characteristic centers, and the second-portion characteristic centers during the time interval to correspondingly obtain a center moving trajectory, a first-portion center moving trajectory, and a second-portion center moving trajectory.

2. The body motion analysis system of claim 1, further comprising:
a motion recognizer, coupled to the timing data processor, used to analyze the center moving trajectory, the first-portion center moving trajectory, and the second-portion center moving trajectory to respectively obtain main-body motion-direction information corresponding to the user, first body-part motion-direction information corresponding to the first body part, and second body-part motion-direction information corresponding to the second body part.

3. The body motion analysis system of claim 2, wherein the motion recognizer, according to a principal component analysis algorithm, individually analyzes the center moving trajectory, the first-portion center moving trajectory, and the second-portion center moving trajectory to respectively obtain main characteristic direction-changing data, first-portion characteristic direction-changing data, and second-portion characteristic direction-changing data; and
wherein the motion recognizer obtains the main-body motion-direction information, the first body-part motion-direction information, and the second body-part motion-direction information according to the main characteristic direction-changing data, the first-portion characteristic direction-changing data and the second-portion characteristic direction-changing data.

4. The body motion analysis system of claim 2, wherein the motion recognizer obtains the sports performance of the user during the time interval according to the first body-part motion-direction information, the second body-part motion-direction information, the first-portion center moving trajectory, and the second-portion center moving trajectory.

5. The body motion analysis system of claim 4, wherein the motion recognizer further sets a threshold to divide the first body-part motion-direction information, the second body-part motion-direction information, the first-portion center moving trajectory, and the second-portion center moving trajectory into a plurality of motion stages such that the sports performance is divided into a plurality of motion types; and
wherein each of the motion types corresponding to the motion stage is translation of the user, spin of the user, or translation-with-spin of the user.

6. The body motion analysis system of claim 5, wherein when a load ratio of the first-localized pressure-distribution data and the second-localized pressure-distribution data corresponding to a first time point is equal to the threshold, the motion recognizer uses the first time point to divide the plurality of motion stages.

7. The body motion analysis system of claim 5, wherein when a slope changing rate of the center moving trajectory corresponding to a first time point is equal to the threshold, the motion recognizer uses the first time point to divide the plurality of motion stages.

8. The body motion analysis system of claim 2, wherein the main-body motion-direction information comprises translation and spin of a central axis of the body of the user on the pressure sensing plate, the first body-part motion-direction information comprises load-supporting, translation, and spin of the first body part, and the second body-part motion-direction information comprises load-supporting, translation, and spin of the second body part.

9. The body motion analysis system of claim 2, further comprising a display device, coupled to a motion playback device and a data visualization device of the motion recognizer, wherein the data visualization device is used to convert the main-body motion-direction information, the first body-part motion-direction information, and the second body-part motion-direction information into the sports performance of the user; and
wherein the motion playback device is used to provide feedback on the sports performance of the user to the display device.

10. The body motion analysis system of claim 1, wherein the data processing device is used to integrate the center moving trajectory, the first-portion center moving trajectory, and the second-portion center moving trajectory onto a common coordinate system.

11. The body motion analysis system of claim 1, wherein the sports performance of the user comprises multiple coherent motion information, change information of center of gravity corresponding to the multiple coherent motion information, change information of pressure of body or limb, or change information of positions of body or limb.

12. A portable device, used to analyze sports performance of a user, wherein the portable device comprises:
a receiving device, used to receive pressure-distribution stream data from a pressure sensing plate, wherein at least two body parts of the user exert pressure on the pressure sensing plate such that the pressure sensing plate senses and outputs the pressure-distribution stream data; and
wherein the pressure-distribution stream data comprises a plurality of frames of the pressure distribution data received within a time interval; and
a data processing device, used to receive the plurality of frames of the pressure distribution data and to classify each of the pressure distribution data as first-localized pressure-distribution data and second-localized pressure-distribution data corresponding to a first body part and a second body part of the user to obtain a plurality of frames of the first-localized pressure-distribution data corresponding to the first body part and a plurality of frames of the second-localized pressure-distribution data corresponding to the second body part for analyzing the sports performance of the user;
wherein the data processing device is used to:
analyze the pressure-distribution stream data to obtain a characteristic center corresponding to each of the pressure distribution data;
analyze each of the first-localized pressure-distribution data to obtain a corresponding first-portion characteristic center and analyze each of the second-localized pressure-distribution data to obtain a corresponding second-portion characteristic center; and
respectively merge the characteristic centers, the first-portion characteristic centers, and the second-portion characteristic centers during the time interval to correspondingly obtain a center moving trajectory, a first-portion center moving trajectory, and a second-portion center moving trajectory.

13. The portable device of claim 12, further comprising:
a motion recognizer, coupled to the timing data processor, used to analyze the center moving trajectory, the first-portion center moving trajectory, and the second-portion center moving trajectory to respectively obtain main-body motion-direction information, first body-part motion-direction information corresponding to the first body part, and second body-part motion-direction information corresponding to the second body part.

14. The portable device of claim 13, wherein the motion recognizer, according to a principal component analysis algorithm, individually analyzes the center moving trajectory, the first-portion center moving trajectory, and the second-portion center moving trajectory to respectively obtain main characteristic direction-changing data, first-portion characteristic direction-changing data, and second-portion characteristic direction-changing data; and
wherein the motion recognizer obtains the main-body motion-direction information, the first body-part motion-direction information, and the second body-part motion-direction information according to the main characteristic direction-changing data, the first-portion characteristic direction-changing data and the second-portion characteristic direction-changing data.

15. The portable device of claim 13, wherein the motion recognizer, according to the first body-part motion-direction information, the second body-part motion-direction information, the first-portion center moving trajectory, and the second-portion center moving trajectory, obtains the sports performance of the user during the time interval.

16. The portable device of claim 15, wherein the motion recognizer further sets a threshold to divide the first body-part motion-direction information, the second body-part motion-direction information, the first-portion center moving trajectory, and the second-portion center moving trajectory into a plurality of motion stages such that the sports performance is divided into a plurality of motion types; and
wherein each of the motion types corresponding to the motion stage is translation of the user, spin of the user, or translation-with-spin of the user.

17. The portable device of claim 16, wherein when a load ratio of the first-localized pressure-distribution data and the second-localized pressure-distribution data corresponding to a first time point is equal to the threshold, the motion recognizer uses the first time point to divide the plurality of motion stages.

18. The portable device of claim 17, wherein when a slope changing rate of the center moving trajectory corresponding to a first time point is equal to the threshold, the motion recognizer uses the first time point to divide the plurality of motion stages.

19. The portable device of claim 13, wherein the main-body motion-direction information comprises translation and spin of a central axis of the body of the user on the pressure sensing plate, the first body-part motion-direction information comprises load-supporting, translation, and spin of the first body part, and the second body-part motion-direction information comprises load-supporting, translation, and spin of the second body part.

20. The portable device of claim 13, further comprising a motion playback device, a data visualization device, and a display device which are coupled to the motion recognizer, wherein the data visualization device is used to convert the main-body motion-direction information, the first body-part motion-direction information, and the second body-part motion-direction information into the sports performance of the user; and
wherein the motion playback device is used to provide feedback on the sports performance of the user to the display device.

21. The portable device of claim 12, wherein the first body part and the second body part correspond to the user's feet.

22. The portable device of claim 12, wherein the sports performance of the user comprises multiple coherent motion information, change information of center of gravity corresponding to the multiple coherent motion information, change information of pressure of body or limb, or change information of positions of body or limb.

23. A body motion analysis method, comprising:
sensing, using a pressure sensing plate, pressure exerted on the pressure sensing plate by at least two body parts of the user and correspondingly outputting pressure distribution data according to the pressure sensed at each time point;
transmitting, using a data transmission device, pressure-distribution stream data according to the pressure distribution data, wherein the pressure-distribution stream data comprises a plurality of frames of the pressure distribution data received within a time interval;

classifying each of the pressure distribution data as first-localized pressure-distribution data and second-localized pressure-distribution data corresponding to a first body part and a second body part of the at least two body parts of the user to obtain a plurality of frames of the first-localized pressure-distribution data corresponding to the first body part and a plurality of frames of the second-localized pressure-distribution data corresponding to the second body part; and analyzing the pressure-distribution stream data, the plurality of frames of the first-localized pressure-distribution data and the plurality of frames of the second-localized pressure-distribution data to obtain sports performance of the user;

wherein obtaining the sports performance of the user comprises:

obtaining a characteristic center corresponding to each of the pressure distribution data;

analyzing each of the first-localized pressure-distribution data to obtain a corresponding first-portion characteristic center and analyzing each of the second-localized pressure-distribution data to obtain a corresponding second-portion characteristic center;

respectively merging the characteristic centers, the first-portion characteristic centers, and the second-portion characteristic centers during the time interval to correspondingly obtain a center moving trajectory, a first-portion center moving trajectory, and a second-portion center moving trajectory; and analyzing the center moving trajectory, the first-portion center moving trajectory, and the second-portion center moving trajectory to respectively obtain main-body motion-direction information corresponding to the user, first body-part motion-direction information corresponding to the first body part, and second body-part motion-direction information corresponding to the second body part.

24. The body motion analysis method of claim 23, further comprising:

individually analyzing, according to a principal component analysis algorithm, the center moving trajectory, the first-portion center moving trajectory, and the second-portion center moving trajectory to respectively obtain main characteristic direction-changing data, first-portion characteristic direction-changing data, and second-portion characteristic direction-changing data; and obtaining the main-body motion-direction information, the first body-part motion-direction information, and the second body-part motion-direction information according to the main characteristic direction-changing data, the first-portion characteristic direction-changing data and the second-portion characteristic direction-changing data.

25. The body motion analysis method of claim 23, further comprising:

obtaining the sports performance of the user during the time interval according to the first body-part motion-direction information, the second body-part motion-direction information, the first-portion center moving trajectory, and the second-portion center moving trajectory.

26. The body motion analysis method of claim 23, further comprising setting a threshold to divide the first body-part motion-direction information, the second body-part motion-direction information, the first-portion center moving trajectory, and the second-portion center moving trajectory into a plurality of motion stages such that the sports performance is divided into a plurality of motion types, wherein each of the motion types corresponding to the motion stage is translation of the user, spin of the user, or translation-with-spin of the user.

27. The body motion analysis method of claim 26, wherein when a load ratio of the first-localized pressure-distribution data and the second-localized pressure-distribution data corresponding to a first time point is equal to the threshold, the motion recognizer uses the first time point to divide the plurality of motion stages.

28. The body motion analysis method of claim 26, wherein when a slope changing rate of the center moving trajectory corresponding to a first time point is equal to the threshold, the motion recognizer uses the first time point to divide the plurality of motion stages.

29. The body motion analysis method of claim 23, wherein the main-body motion-direction information comprises translation and spin of a central axis of the body of the user on the pressure sensing plate, the first body-part motion-direction information comprises load-supporting, translation, and spin of the first body part, and the second body-part motion-direction information comprises load-supporting, translation, and spin of the second body part.

30. The body motion analysis method of claim 23, further comprising:

converting the main-body motion-direction information, the first body-part motion-direction information, and the second body-part motion-direction information into the sports performance of the user; and feeding the sports performance of the user back to the display device.

31. The body motion analysis method of claim 23, wherein the first body part and the second body part correspond to the user's feet.

32. The body motion analysis method of claim 23, wherein the sports performance of the user comprises multiple coherent motion information, change information of center of gravity corresponding to the multiple coherent motion information, change information of pressure of body or limb, or change information of positions of body or limb.

* * * * *